(12) United States Patent
Chiang et al.

(10) Patent No.: US 10,454,802 B2
(45) Date of Patent: Oct. 22, 2019

(54) BACKEND POLLING BASED ON NONZERO SIP SUBSCRIBE EXPIRATION

(71) Applicant: T-Mobile USA, Inc., Bellevue, WA (US)

(72) Inventors: Hsin-Fu Henry Chiang, Bellevue, WA (US); Adrian Synal, Snohomish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 360 days.

(21) Appl. No.: 14/788,438

(22) Filed: Jun. 30, 2015

(65) Prior Publication Data

US 2017/0006110 A1 Jan. 5, 2017

(51) Int. Cl.
*H04L 12/26* (2006.01)
*H04L 29/06* (2006.01)

(52) U.S. Cl.
CPC .......... *H04L 43/16* (2013.01); *H04L 65/1006* (2013.01)

(58) Field of Classification Search
CPC ...... H04L 67/14; H04L 43/16; H04L 65/1006
See application file for complete search history.

(56) References Cited

U.S. PATENT DOCUMENTS

| | | | | |
|---|---|---|---|---|
| 7,293,271 B2* | 11/2007 | Trossen | ................... | H04L 29/06 709/224 |
| 7,764,955 B1* | 7/2010 | Mangal | ............. | H04M 3/42306 370/396 |
| 7,933,982 B2* | 4/2011 | Tung | ..................... | G06Q 10/107 709/223 |
| 8,874,753 B2* | 10/2014 | Ben-Ezra | ............ | H04L 12/5815 370/352 |
| 9,729,631 B2* | 8/2017 | Addala | ............... | H04L 67/1095 |
| 2006/0098624 A1* | 5/2006 | Morgan | ............ | H04L 29/06027 370/352 |
| 2006/0104306 A1* | 5/2006 | Adamczyk | .............. | H04L 67/24 370/466 |
| 2008/0313321 A1* | 12/2008 | Kiss | ........................ | H04L 67/24 709/223 |

(Continued)

FOREIGN PATENT DOCUMENTS

| EP | 2493166 A1 * | 8/2012 | ........ H04M 3/42374 |
|---|---|---|---|
| WO | WO-2004059502 A1 * | 7/2004 | ....... H04L 29/06027 |

OTHER PUBLICATIONS

Roach, et al., "Request for Comments: 4662—A Session Initiation Protocol (SIP) Event Notification Extension for Resource Lists", The Internet Society Standards Track (Aug. 2006).*

(Continued)

*Primary Examiner* — Kamal B Divecha
*Assistant Examiner* — Sandarva Khanal
(74) *Attorney, Agent, or Firm* — Lee & Hayes, P.C.

(57) ABSTRACT

Methods and computing systems may cause SIP backend polling based on nonzero SIP subscribe expiration. A SIP server receives from a SIP client a Session Initiation Protocol (SIP) subscribe message indicating a nonzero expiration time. Based at least on receipt of the subscribe message indicating a nonzero expiration time, the SIP server initiates a backend polling session to a backend server. The SIP server receives, via the backend polling session, state information and provides the state information to the SIP client.

16 Claims, 4 Drawing Sheets

(56) References Cited

U.S. PATENT DOCUMENTS

| | | | | |
|---|---|---|---|---|
| 2009/0010163 | A1* | 1/2009 | Isomura | H04W 28/08 370/235 |
| 2010/0077038 | A1* | 3/2010 | Boberg | H04L 67/14 709/206 |
| 2010/0094952 | A1* | 4/2010 | Lindgren | G06Q 10/06 709/219 |
| 2010/0257077 | A1* | 10/2010 | Cai | G06Q 30/04 705/34 |
| 2011/0028130 | A1* | 2/2011 | Swaminathan | H04M 3/42195 455/414.1 |
| 2011/0153765 | A1* | 6/2011 | Kowalewski | H04L 12/1813 709/206 |
| 2011/0153794 | A1* | 6/2011 | Clark | H04L 65/1066 709/222 |
| 2011/0252141 | A1* | 10/2011 | Boberg | H04L 67/24 709/226 |
| 2012/0096123 | A1* | 4/2012 | Klein | H04L 67/24 709/219 |
| 2013/0060938 | A1* | 3/2013 | McColgan | H04L 51/043 709/224 |
| 2013/0137408 | A1* | 5/2013 | Buschner | H04Q 3/0029 455/415 |
| 2013/0143565 | A1* | 6/2013 | Zisimopoulos | H04W 36/14 455/436 |
| 2014/0280992 | A1* | 9/2014 | Khan | H04L 69/40 709/228 |
| 2014/0372557 | A1* | 12/2014 | Buckley | H04L 67/104 709/217 |
| 2015/0120947 | A1* | 4/2015 | Guo | H04L 65/1016 709/228 |

OTHER PUBLICATIONS

Zhao, et al., "A New Mechanism of EAB in RCS", in H. Tan (Ed.): Knowledge Discovery and Data Mining, AISC 135, pp. 247-254. Springer-Verlag Berlin Heidelberg 2012.*
A. B. Roach, "Request for Comments: 3265—Session Initiation Protocol (SIP)-Specific Event Notification", The Internet Society Standards Track (Jun. 2002).*
Rosenberg, et. al., "Request for Comments: 3261—SIP: Session Initiation Protocol", The Internet Society Standards Track (Jun. 2002).*
A.B. Roach, "Request for Comments: 6665—SIP-Specific Event Notification", Internet Engineering Task Force (IETF) Standards Track (Jul. 2012).*
Freed & Klensin, "Request for Comments: 4288—Media Type Specifications and Registration Procedures", The Internet Society Best Current Practice (Dec. 2005).*
Rosenberg, et al., "Request for Comments: 3840—Indicating User Agent Capabilities in the Session Initiation Protocol (SIP)", The Internet Society Standards Track (Aug. 2004).*
Johnston, et al., "Request for Comments: 3665—Session Initiation Protocol (SIP) Basic Call Flow Examples", The Internet Society Best Current Practice (Dec. 2003).*
Open Mobile Alliance Presence SIMPLE Specification, Approved Version 2.0 (OMA-TS-Presence_SIMPLE-V2_0-20120710-A), Jul. 10, 2012, Open Mobile Alliance Ltd.*
GSM Association Official Document RCC.52, RCS Presence Best Practice Optimization Guidelines, Version 1.0, Sep. 25, 2013.*
A. B. Roach, "Request for Comments: 3265—SIP-Specific Event Notification", The Internet Society Standard Track (Jun. 2002).*
Zhao, et al., "A New Mechanism of EAB in RCS", in H. Tan (Ed.): Knowledge Discovery and Data Mining, AISC 132, pp. 247-254. Springer-Verlag Berlin Heidelberg 2012.*
Rosenberg, et al., "Request for Comments: 3261—SIP: Session Initiation Protocol", The Internet Society Standard Track (Jun. 2002).*
A. B. Roach, "Request for Comments: 3265—SIP-Specific Event Notification", The Internet Society Standard Track, Jun. 2002. (Year: 2002).*
Zhao, et al., "A New Mechanism of EAB in RCS", in H. Tan (Ed.): Knowledge Discovery and Data Mining, AISC 132, pp. 247-254. Springer-Verlag Berlin Heidelberg 2012 (Year: 2012).*
GSM Association Official Document RCC.52—RCS Presence Best Practice Optimization Guidelines, Version 1.0, Sep. 25, 2013. (Year: 2013).*
Rosenberg, et al., "Request for Comments: 3261—SIP: Session Initiation Protocol", The Internet Society Standard Track (Jun. 2002). (Year: 2002).*
Open Mobile Alliance Ltd."Open Mobile Alliance Presence Simple Specification", Approved Version 2.0 (OMA-TS-Presence_SIMPLE-V2_0-20120710-A), Jul. 10, 2012. (Year: 2012).*
Roach et al. Request for Comments: 4662—A Session Initiation Protocol (SIP) Event Notification Extension for Resource Lists, Aug. 2006. The Internet Society (2006). (Year: 2006).*

* cited by examiner

BACKEND POLLING BASED ON NONZERO SIP SUBSCRIBE EXPIRATION

BACKGROUND

Session Initiation Protocol (SIP), as extended by RFC 3265 ("Session Initiation Protocol (SIP)-Specific Event Notification", June 2002), utilizes a subscribe method to request a current state as well as state updates from a remote node. The specification for Open Mobile Alliance (OMA) Presence SIMPLE (SIP for Instant Messaging and Presence Leveraging Extensions) defines mechanisms for utilizing SIP to perform instant messaging and other functions. Rich Communication Services (RCS) is a GSM Association (GSMA) program that provides for inter-operability within an IP Multimedia Subsystem (IMS). One feature of RCS is the ability to discover capabilities of contacts. RCS utilizes OMA SIMPLE for various features, including subscription to a presence server (PS) to obtain capability information for a list of contacts.

RFC 3265 defines a persistent subscription session and a polling resource session, both of which may be used by OMA SIMPLE and RCS to obtain capabilities information. An "expires" header within the SIP SUBSCRIBE request determines whether the RCS server initiates a persistent subscription session or a polling resource session. In particular, an "expires" header indicating an expiration of zero seconds triggers polling behavior. A non-zero "expires" header, if accepted, causes a persistent subscription lasting the number of seconds indicated by the "expires" header itself. For example, an "expires" header of 3600 results in a persistent subscription of 3600 seconds.

In an RCS network, a SIP client registers with a Resource List Server (RLS) and with a PS, and publishes its capabilities to its PS. The SIP client sends a SIP Anonymous List Subscribe (or a SIP List Subscribe) message to the RLS, indicating a subscription to presence and capabilities for its contacts. Where the SIP subscribe message has a nonzero expires header, a persistent session is set up with the RLS. The RLS notifies the IMS home network of the SIP client that it has an active subscription with the SIP client, and then establishes a SIP Anonymous short-lived Backend Subscribe session through the IMS home network to the PS. The IMS home network establishes a binding within a home subscription server (HSS) to track the persistent session to the PS, and the PS communicates with a Shared XDMS (XML Document Management Specification) server to obtain presence and capability information for the SIP client's contacts. Once received, the PS communicates the presence and capability information back to the RLS, and the RLS sends SIP Notify messages back to the SIP client, including updates, for as long as the SIP Subscribe expiration time lasts.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
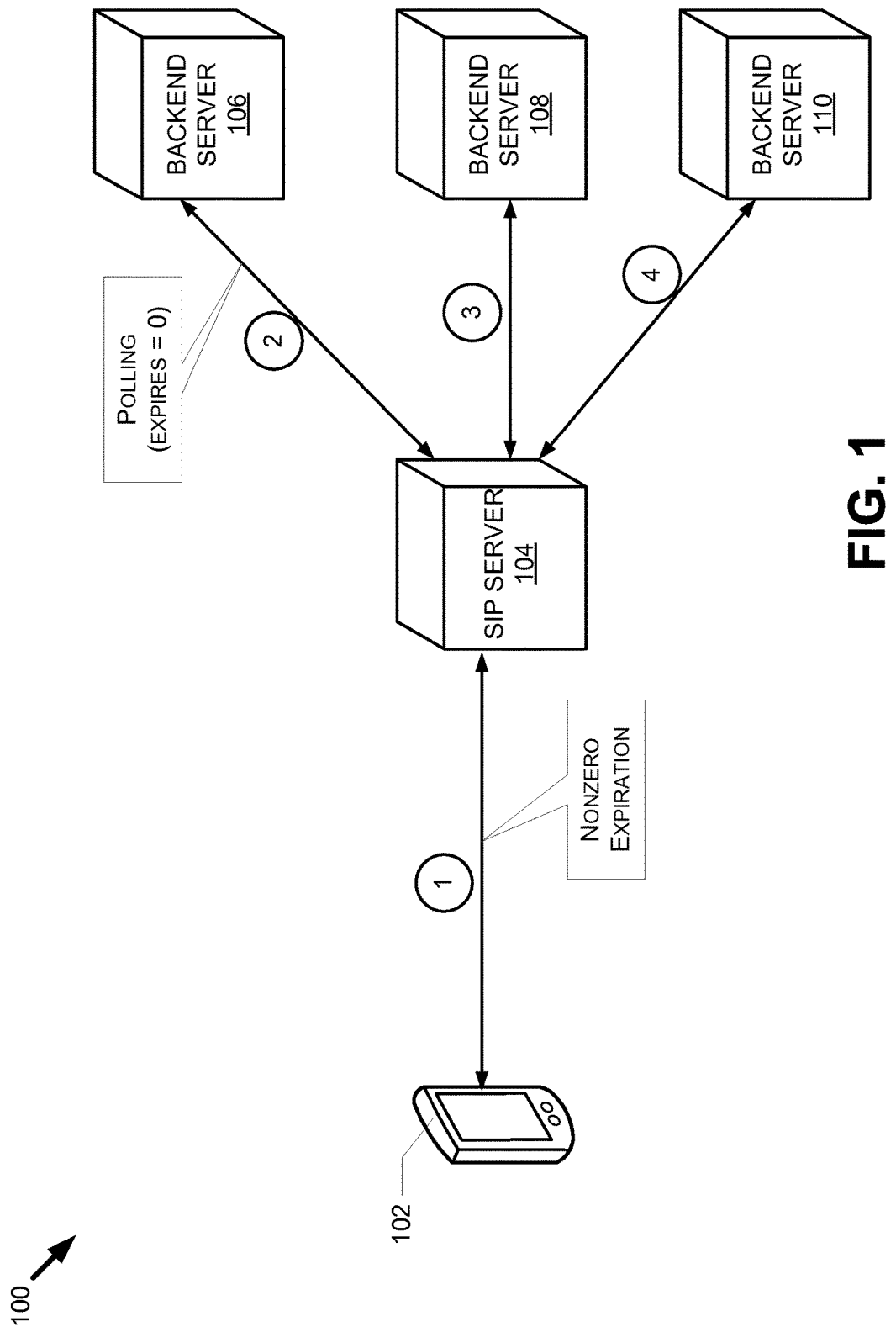
FIG. 1 illustrates an environment for initiating backend polling based on a nonzero SIP subscription expiration.

In embodiments of the present description, a SIP server initiates a backend SIP polling session, rather than a persistent subscription, in some situations where the SIP client's subscription session is persistent (e.g., has a nonzero expiration). By using a polling session in the backend, rather than a short-lived backend subscription session, state information can be provided more quickly while utilizing fewer resources, such as fewer resources in the backend servers.

Embodiments utilize various criteria to determine whether to initiate a polling session on the backend. Such criteria include, among other things, the duration indicated by the "expires" header in the SIP client's subscribe messages. In some embodiments of the present disclosure, expire durations indicated in a SIP subscribe message from a SIP client that fall below a predetermined threshold result in a backend polling session rather than a short-lived persistent backend subscription session.

In other examples, the determination to use backend polling, rather than a persistent subscription session, may be based on the type of client device, based on SIP server configuration, based on client device behavior, or based on other criteria. Basing the determination on type of client device or on client device behavior may be appropriate where the client device is configured to deviate from the SIP standard. For example, all client devices from a certain manufacturer may end their SIP subscription after receiving an initial batch of state information (such as presence, capabilities, etc.), without waiting for the "expires" header duration to expire. Thus, the SIP client may essentially treat the persistent SIP subscription as a polling session, which results in wasted resources in the backend if backend persistent subscriptions are utilized. Therefore, observations that a particular client device, or type of client device, behaves in this way results in a determination to initiate backend polling. More generally, the determination may be based on characteristics of one or more client devices, such as based on client device model number, client device operating system type and/or version, client device manufacturer, and so forth.

One advantage of a persistent subscription is the ability to provide the SIP client with more than just a "snapshot" of the state information by also providing updates to state information for the duration of the subscription. But changes in state, such as contacts' presence, social presence, and capability information for example, are unlikely to occur in the few seconds or minutes that a short-lived persistent subscription remains active. Also, even where the persistent subscription with the SIP client is relatively long, but the client device tends to end the subscription session after receiving only initial state information, a backend persistent subscription is unable to provide the SIP client with updates, even when they are available before the expiration of the subscription. In these situations, initiating a backend polling session to obtain one-time state information instead of a persistent subscription session is not likely to miss significant numbers of updates. And a polling session uses fewer resources on the backend, compared with a persistent subscription session which ties up backend resources for a longer period of time.

In a specific implementation, the SIP server is an RLS, and the backend server is an OMA Simple Presence server (PS). However, other SIP implementations may be utilized without departing from the scope of embodiments. For example, embodiments may include a Voice over IP (VoIP) system, video call system, or other system, that utilizes SIP to determine state information, such as presence and capabilities. Also, in some embodiments, social presence may be utilized. In some embodiments, different types of subscription may be used for different types of information. For example, a persistent subscription may be utilized for social presence information (e.g., a favorite contacts list), while polling subscription according to embodiments of the present disclosure may be used to obtain other contact presence information. Other examples are possible without departing from the scope of embodiments.

FIG. 1 illustrates an environment 100 for initiating backend polling based on a nonzero SIP subscription expiration. A client device 102, transmits a SIP subscribe message indicating a nonzero expiration. The SIP subscribe message may be a SIP Anonymous List Subscribe or a SIP List Subscribe message. The SIP server 104 replies with an acknowledgment and establishes a persistent subscription session with the client device 102 (shown in FIG. 1 with arrow indicated with a circled "1"). The actual duration of the SIP subscription with the client device 102 is established may be based on an "expires" header duration indicated in the acknowledgement, but is generally no longer than the duration indicated in the SIP subscribe message sent from the client device 102. In embodiments, the SIP subscribe message may indicate a request to subscribe to presence information and/or capabilities information for a list of other devices, such as for a list of contacts.

In any event, based on various criteria, the SIP server 104 determines whether to initiate polling sessions or short-lived persistent subscription sessions with the backend servers 106, 108, and 110, in order to obtain the state information (such as presence and capabilities information) subscribed to by the client device 102. The backend servers 106-110 may be OMA SIMPLE PSs, although they may be other types of backend servers in various embodiments. The SIP server 104 identifies the backend servers 106-110 with which to establish subscription sessions on behalf of the client device 102 based at least in part on the list of state of information indicated in the SIP subscribe message sent by the client device 102. For example, where the SIP subscribe message indicates a subscription to presence and capabilities information of a list of contacts, the backend servers may be PSs with which one or more of the contacts have registered their presence and capabilities information. The SIP server may initiate subscription sessions with more or fewer backend servers than are shown in FIG. 1.

The criteria for determining the type of backend subscription session (polling or persistent) includes, among other things, the duration of the nonzero expiration indicated in the SIP subscribe message sent by the client device 102 and received by the SIP server 104, characteristics of the client device 102, configuration in the SIP server 104, past behavior of the client device 102, or a combination of these or other criteria. Other examples are possible without departing from the scope of embodiments.

Where a determination to establish polling sessions with the backend servers 106, 108, and 110 is based at least in part on a duration of the nonzero expiration indicated in the SIP subscribe message sent by the client device 102, the SIP server 104 determines whether the expiration time is less than or equal to a predetermined threshold. The predetermined threshold may be a configurable setting on the SIP server 104. Where the expiration indicated is less than or equal to the predetermined threshold, the SIP server 104 initiates a backend polling subscription session with the backend servers 106-110. Where the expiration indicated is greater than the predetermined threshold, the SIP server 104 initiates a persistent backend subscription session with the backend servers 106-110.

In some embodiments, the SIP server 104 initiates the backend subscription sessions based on characteristics of the client device 102. The characteristics include manufacturer, model, version, operating system information, software client (such as a SIP client) version, and so forth. The characteristics of the client device 102 may also include a unique identifier associated with the client device 102, such as a username of a user associated with the client device 102, an IP address, a phone number of the client device 102, a subscriber number, and so forth. The SIP server 104 determines, in some embodiments, whether the characteristics of the client device 102 match a predetermined list of characteristics, and initiates a backend subscription session with the backend servers 106-110 based on matches with the characteristics. In the same or different embodiments, the SIP server 104 bases the determination on a combination of characteristics, such as by matching some, all, or none of a predetermined list of characteristics to determine a type of subscription session to initiate. In one example, the SIP server 104 may determine to initiate a polling session where the manufacturer and the model number both match a predetermined list of characteristics. Other examples are possible without departing from the scope of embodiments.

In some embodiments, all or portions of the predetermined list of characteristics are configured into the SIP server 104. In the same or different embodiments, all or portions of the predetermined list of characteristics are determined based on automated observations of past behavior of the client device 102 and/or a plurality of client devices, which may include the client device 102. Past behavior includes, in some embodiments, behaviors with respect to past SIP subscription sessions. For example, the past behaviors may include one or more of termination of SIP subscriptions prior to the expiration of the expiration period, termination of SIP subscriptions after receiving initial state information, discarding updates after initial state information is provided to the client devices, and so forth. Generally speaking, past behavior that indicates that the client device 102 is not likely to accept updates or to maintain the SIP subscription session long enough to receive updates indicates that the SIP server 104 may establish backend polling subscription sessions with the backend servers 106-110 without much impact, if any, on the ability of the SIP server 104 to provide state information updates during the course of the subscription session with the client device 102.

The SIP server 104 is configured, in some embodiments, to always establish a backend polling session, no matter the characteristics of the client device 102 or the duration of the expiration of the subscription session with the client device 102. In other embodiments, the SIP server 104 is configured to establish backed polling sessions based on other criteria, such as based on time information (e.g., time of day, time of week, etc.), network performance (congestion, delay, dropped packets), backend resource load (processor load, memory load, backend network loads), or information from the SIP subscription message sent by the client device 102, such as the length of the list of contacts for which presence and capabilities are requested, the type or an amount of state information requested, and so forth. Other examples are possible without departing from the scope of embodiments.

Various machine learning or similar techniques may be utilized by the SIP server 104 (or other system) to determine criteria that indicate that the client devices are not likely to receive updates. Thus, characteristics and behaviors of a plurality of client devices may be monitored, recorded, and then fed into a machine learning algorithm to establish client device characteristics that result in establishing a backend polling subscription session. In the same or different embodiments, various machine learning or similar techniques may also be utilized by the SIP server 104 (or other system) to determine a threshold expiration time that indicates that the client devices are not likely to receive updates, such as based on a likelihood of receiving updates. For example, the threshold may be based on a 5% likelihood of not receiving updates, such that criteria, such as client device characteristics and SIP subscription expiration durations, that are associated with a 5% or less likelihood of receiving updates to initial state information are established as criteria for establishing a backend polling subscription session. Other examples are possible without departing from the scope of embodiments.

Based on the above described criteria, the SIP server 104 initiates backend subscription polling sessions with the backend servers 106-110 (indicated in FIG. 1 with circled "1", "2", and "3"). To initiate a backend subscription polling session, the SIP server 104 may transmit a SIP subscribe message indicating an expiration of zero, such as by including an "expires" header indicating zero seconds. The backend servers 106-110 provide state information (such as presence and/or capabilities information, or other information) to the SIP server 104 via the backend subscription polling sessions. Once the state information is provided to the SIP server 104, the backend subscription polling sessions with the backend servers 106-110 are terminated, thereby immediately freeing up the backend resources, including among other things resources in the backend servers 106-110, network traffic, and so forth. The SIP server 104 provides the state information to the client device 102. When the subscription expiration period runs out, the persistent subscription session with the client device 102 is ended (unless it is renewed prior to expiration such as by transmitting a new SIP subscribe message indicating a new expiration time).

Figure 2:
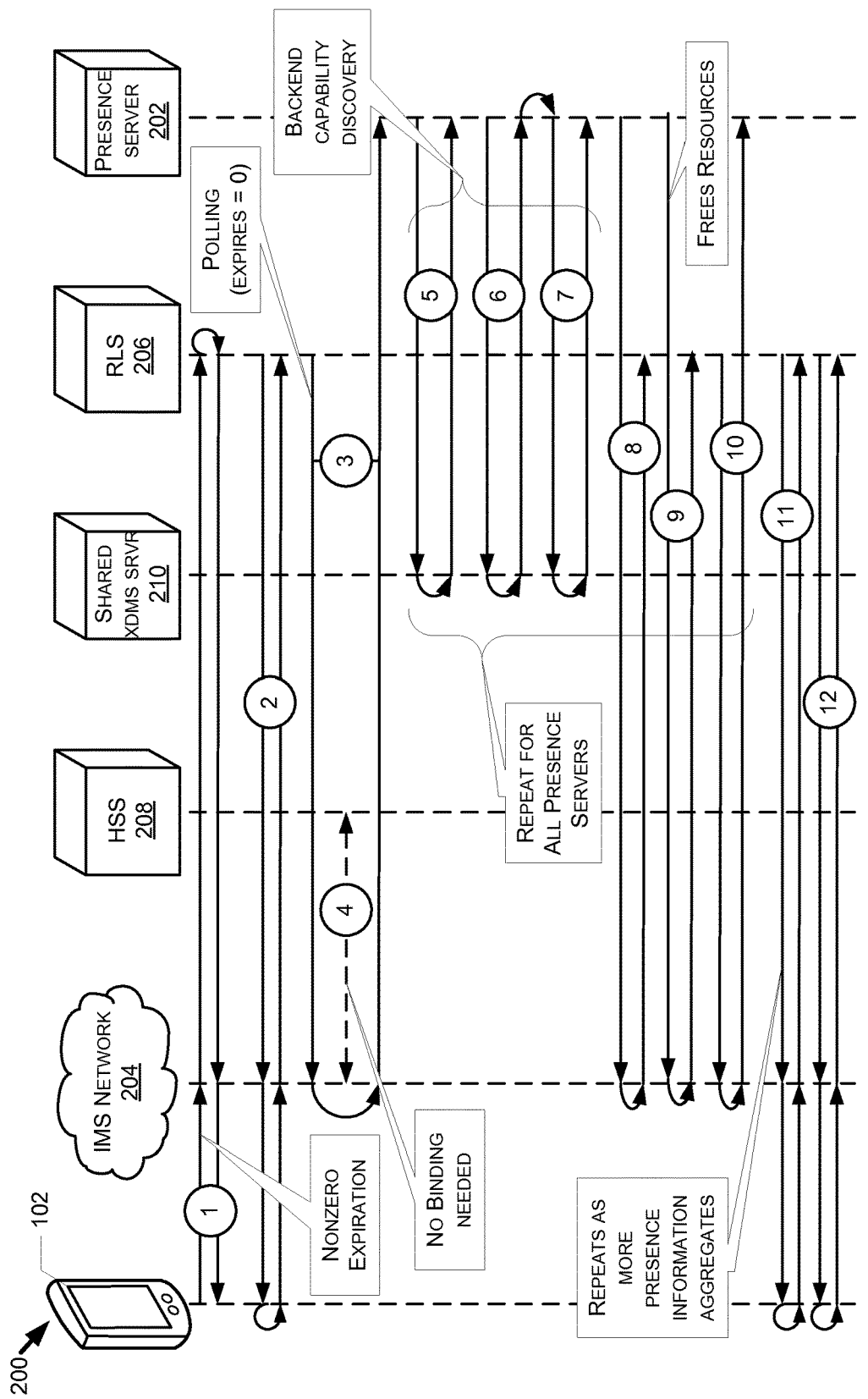
FIG. 2 illustrates protocol communication flows for initiating backend polling based on a nonzero SIP subscription expiration in a GSMA RCS-enabled network.

FIG. 2 illustrates a protocol communication flow 200 for initiating backend polling based on a nonzero SIP subscription expiration in a GSMA RCS-enabled network. A SIP client on the client device 102 may publish its presence and capabilities information to a PS, such as to a PS 202. The PS 202 may be a RLS server, such as a combination server that performs both RLS server functions and PS functions. The PS 202 is just one example of a backend server, such as backend servers 106-110, that performs presence or other RCS functions. Other SIP clients on other client devices, which may be contacts of the client device 102, may do the same. FIG. 2 illustrates communication flow 200 according to embodiments that enable the client device 102 to obtain the presence and capabilities information of its contacts. This is just one example of initiating backend polling based on a nonzero SIP subscription expiration, and is included to aid in understanding.

The client device 102, as part of the communication flow 200, transmits a subscribe message through the IMS network 204 to an RLS 206. The subscribe message in this example is a SIP Anonymous List Subscribe message indicating a nonzero expiration in an "expires" header. In other embodiments (such as when obtaining social presence information), a SIP List Subscribe may be used rather than a SIP Anonymous List Subscribe. The message requests OMA SIMPLE Presence information, and includes a resource list document, indicating uniform resource identifiers (URIs) of the contacts (also called "presentities") for which the client device requests presence and/or capabilities information. In a social presence application, the contact list does not have to be in a Subscribe message body; the list can be a link address pointing to a repository server like a shared XDMS (such as the shred XDMS Server 210 described in more detail elsewhere within this Detailed Description). This exchange is shown in FIG. 2 with a circled "1." The RLS 206 replies with a SIP "200 Accepted" message as acknowledgement of the subscription message. The RLS 206 transmits a SIP Notify message to the client device 102 to establish a persistent subscription session with the client device 102 having an expiration that is no larger than the nonzero expiration in the "expires" header of the subscription message transmitted by the client device 102. The client device 102 acknowledges with a "200 OK" message (an exchange shown in FIG. 2 with a circled "2").

The RLS 206 parses the list of contacts in the SIP Anonymous List Subscribe message and determines one or more PSs, such as the PS 202, from which to obtain some or all of the requested presence and capabilities information. As described elsewhere within this Detailed Description, the RLS 206 determines to establish backend subscription polling sessions, rather than persistent subscription sessions, with the PSs, based on criteria described elsewhere within this Detailed Description (such as based on the expiration time indicated in the SIP Anonymous List Subscribe message being less than or equal to a predetermined threshold).

To initiate backend subscription polling sessions with the PS 202, the RLS 206 transmits a SIP Anonymous Polling backend Subscribe message to the PS 202 via the IMS network 204 (this exchange is illustrated in FIG. 2 as a circled "3"). In other embodiments, the RLS 206 communicates with the PS 202 directly, without going through the IMS network 204. The SIP Anonymous Polling backend Subscribe message indicates an expiration of zero seconds, such as in an "expires" header. The SIP Anonymous Polling backend Subscribe message indicates a uniform resource identifier (URIs) or other information indicating a contact, e.g., a "presentity," for which the client device requests presence and/or capabilities information. A "presentity" is an entity having presence and/or capabilities information associated with it, such as presence status, reachability, willingness to communicate, communication capabilities, etc.). A different SIP Anonymous Polling backend Subscribe message may be sent for each individual contact indicated by the client device 102 request.

A persistent IP Anonymous Polling backend Subscribe message (i.e., one with a nonzero "expires header") would result in the IMS network 204 binding to the HSS 208 to maintain the persistent subscription to the PS 202 on behalf of the client device 102 (shown in FIG. 2 with a circled "4"). But a polling subscription session does not require such a binding. And because binding takes time and additional resources, using a polling session rather than a persistent subscription on the backend reduces the amount of time taken to reply to the client device request, and also utilizes fewer network and computing resources in the IMS network 204 and the HSS 208. A binding also increases the possibility of staled subscribers in the HSS 208 during an outage situation. Thus, a polling subscription reduces the possibility of staled subscribers in the HSS 208 during an outage situation.

The PS 202, in response to the SIP Anonymous Polling backend Subscribe message received from the RLS 206, requests information from a shared XDMS server 210. The information requested is associated with a resource list document, indicating a uniform resource identifier (URI) of a presentity for which the client device 102 requests presence and/or capabilities information. The PS 202 transmits a SIP Subscribe message to the shared XMDS server 210 indicating a uniform resource identifier (URI) of a presentity for which the client device 102 requests presence and/or capabilities information, and the shared XMDS server 210 responds with a "200 OK" message (exchange illustrated in FIG. 2 with a circled "5"). The shared XMDS server 210 transmits a SIP Notify message indicating that it has the presence and/or capabilities of the presentity and the PS 202 acknowledges with a "200 OK" message (exchange illustrated in FIG. 2 with a circled "6"). The PS 202 transmits an XML Configuration Access Protocol (XCAP) Get message to the shared XMDS server 210 to obtain the information associated with the URI of the presentity, and the shared XMDS server 210 replies with the requested information (exchange illustrated in FIG. 2 with a circled "7"). In some embodiments, the Shared XDMS Server 210 is a SIP server with a local XDMS. In some embodiments, the Shared XDMS Server 210 is local (e.g., integrated with) the PS 202.

The PS 202 transmits an acknowledgement ("200 OK") message back to the RLS 206 via the IMS network 204 (a communication shown in FIG. 2 with a circled "8"). The PS 202 transmits a SIP notify message indicating the information for the presentity (e.g., the presence and capabilities information for the contact) requested by the RLS 206 in its SIP Anonymous Polling backend Subscribe message, as well as indicating that the polling session has timed out and therefore is terminated (exchange illustrated in FIG. 2 with a circled "9"). This immediate termination of the polling session frees up resources as soon as initial state information (e.g., presence and capabilities information) is provided to the RLS 206. The RLS 206 acknowledges the SIP Notify message, with e.g., a "200 OK" message (exchange illustrated in FIG. 2 with a circled "10").

The exchanges identified in FIG. 2 with circles 3-10 repeat for each of the contacts requested in the SIP Anonymous List Subscribe message sent by the client device 102. It is not unusual for the client device 102 to request presence information for 100 or more contacts, so there may be 100 or more exchanges to obtain contact information (although there may be fewer, depending on the number of contacts requested). If persistent SIP subscriptions were used instead of polling subscriptions, there might be 100 HSS bindings, and 100 persistent SIP sessions for each SIP Anonymous List Subscribe message received by the RLS 206. In the aggregate, this would result in tying up and consuming a large number of resources, such as network resources, processor resources, memory resources, and so forth. By utilizing polling, fewer resources are consumed, and resources are freed up more quickly.

The RLS 206 aggregates the presentity information, e.g., the presence information and/or capabilities information for the contacts requested in the SIP Anonymous List Subscribe message sent by the client device 102. The RLS 206 transmits to the client device 102, via the IMS network 204, a SIP Notify message including the presence and/or capabilities information for one or more contacts. This exchange, illustrated in FIG. 2 with a circled "11," is repeated as more presence information is received from PSs, such as the PS 202, and aggregated by the RLS 206. Upon expiration of the expiration time period indicated in the SIP Anonymous List Subscribe message (or other expiration time period as may be established by the RLS 206), the RLS 206 transmits another SIP notify message indicating that the SIP subscription session is terminated (timed out).

Figure 3:
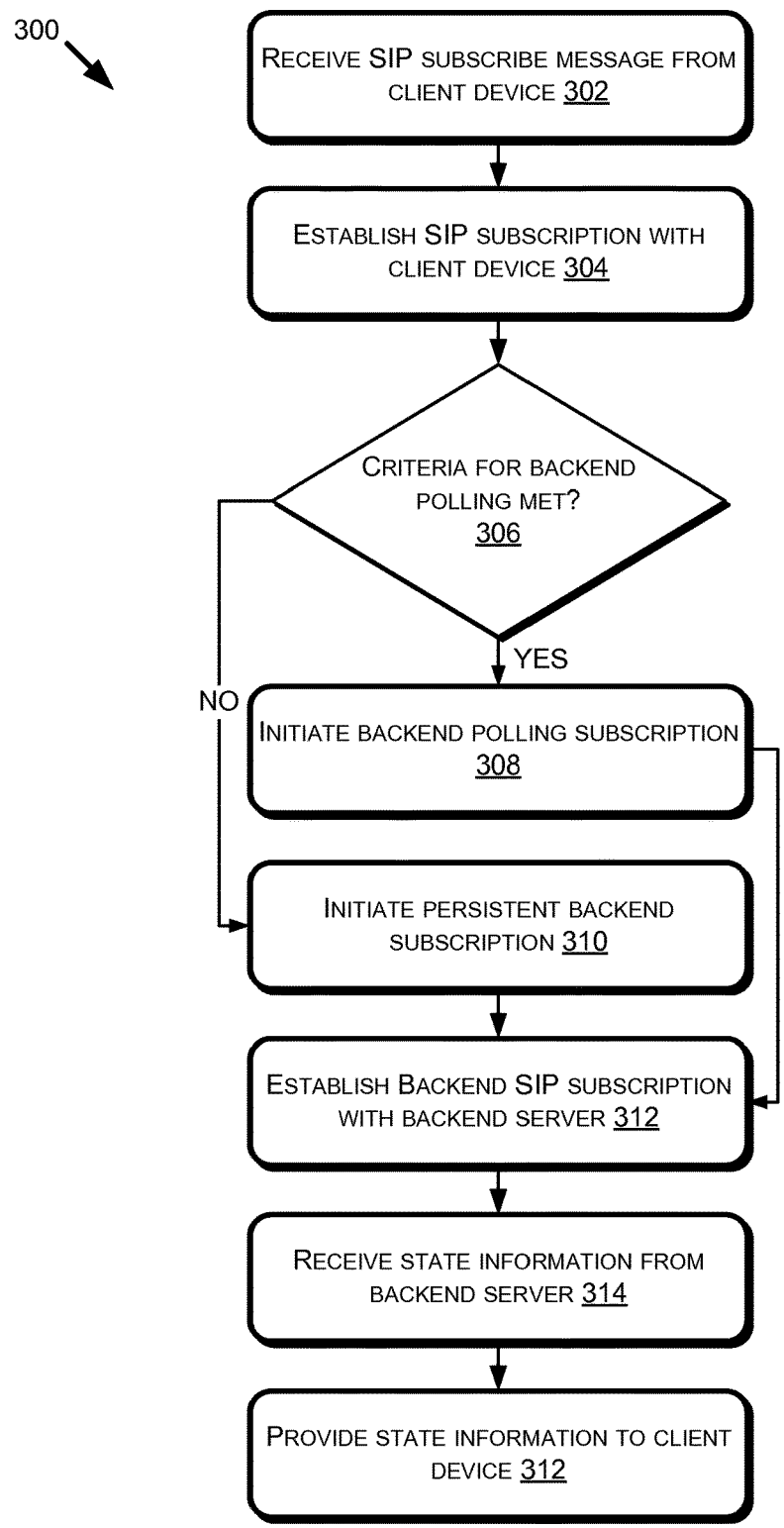
FIG. 3 illustrates a process for initiating backend polling based on a nonzero SIP subscription expiration.

FIG. 3 illustrates a process 300 for initiating backend polling based on a nonzero SIP subscription expiration. At 302, a SIP server, such as the SIP server 104 or the RLS 206, receives a request from a client device, such as the client device 102, to establish a Session Initiation Protocol (SIP) subscription, and the request indicates a session timeout greater than zero. In some embodiments, the subscribe message is a subscribe message for contact information, such as presence and/or capabilities information associated with a one or more entities or contacts. For example, the subscribe message may be a SIP Anonymous List Subscribe message. The message requests OMA SIMPLE Presence information, and includes a resource list document, indicating uniform resource identifiers (URIs) of the contacts. The SIP subscribe message may include a nonzero expiration in an "expires" header.

At 304, the SIP server establishes a SIP subscription with the client device. In some, embodiments the SIP subscription may be a persistent expiration, e.g., one having an expiration or timeout greater than zero. In some embodiments, establishing the SIP subscription includes transmitting a SIP Notify message to the client device to establish a persistent subscription session with the client device. In some embodiments, the client device may transmit a request to establish a SIP subscription session having a nonzero expiration, and the SIP server responds with a SIP Notify message having a zero second expiration, thereby establishing a polling session rather than a persistent session with the client device.

At 306, the SIP server determines whether to establish a backend polling session or a persistent subscription session with a backend server. The criteria may include at least a duration of the expiration indicated in the SIP subscribe message received from the client device and/or the duration of the expiration in the SIP subscription session established with the client device. In some embodiments, the criteria may include at least a characteristic of the client device, a past behavior of the client device, past behaviors of a plurality of client devices, time-based information, network or computing load information, the nature of the state information requested by the client device (such as based on a number of contacts requested, a number of backend servers that are to be contacted to fulfill the client device request, etc.), and so forth. In some embodiments, the SIP server may be configured to establish backend polling, regardless of the characteristics of the client device, the length of the expiration indicated in the client device subscription request, or other criteria. Other examples are possible without departing from the scope of embodiments.

At 308 (the "YES" arrow), the SIP server initiates a backend polling subscription with a backend server. The backend server may be, for example, a PS, although other types of backend servers may be used without departing from the scope of embodiments. Initiating the backend polling subscription includes transmitting to the backend server a SIP polling subscribe message. The SIP polling subscribe message indicates a zero expiration.

At 310 (the "NO" arrow), the SIP server initiates a persistent backend subscription with a backend server. Initiating the backend polling subscription includes transmitting to the backend server a SIP polling subscribe message. The SIP polling subscribe message indicates a nonzero expiration.

At 312, a SIP subscription is established with the backend server. At 314, the SIP server receives from the backend server, the state information requested in the backend SIP subscription message transmitted to the backend server. The state information may include presence information, capabilities information, or other information according to various embodiments. Where the SIP subscription session established with the backend server is a polling session, the SIP subscription is immediately terminated once the requested state information is provided to the SIP server.

At 316, the SIP server provides the state information to the client device. The SIP server may aggregate the state information from multiple backend servers, such as multiple PSs, and send the aggregated information to the client device in SIP Notify messages. The SIP server may continue to provide state information for as long as the SIP subscription session established with the client device does not expire. Where the SIP subscription session established with the client device is a polling session, the SIP subscription is immediately terminated once the requested state information is provided to the SIP server.

Figure 4:
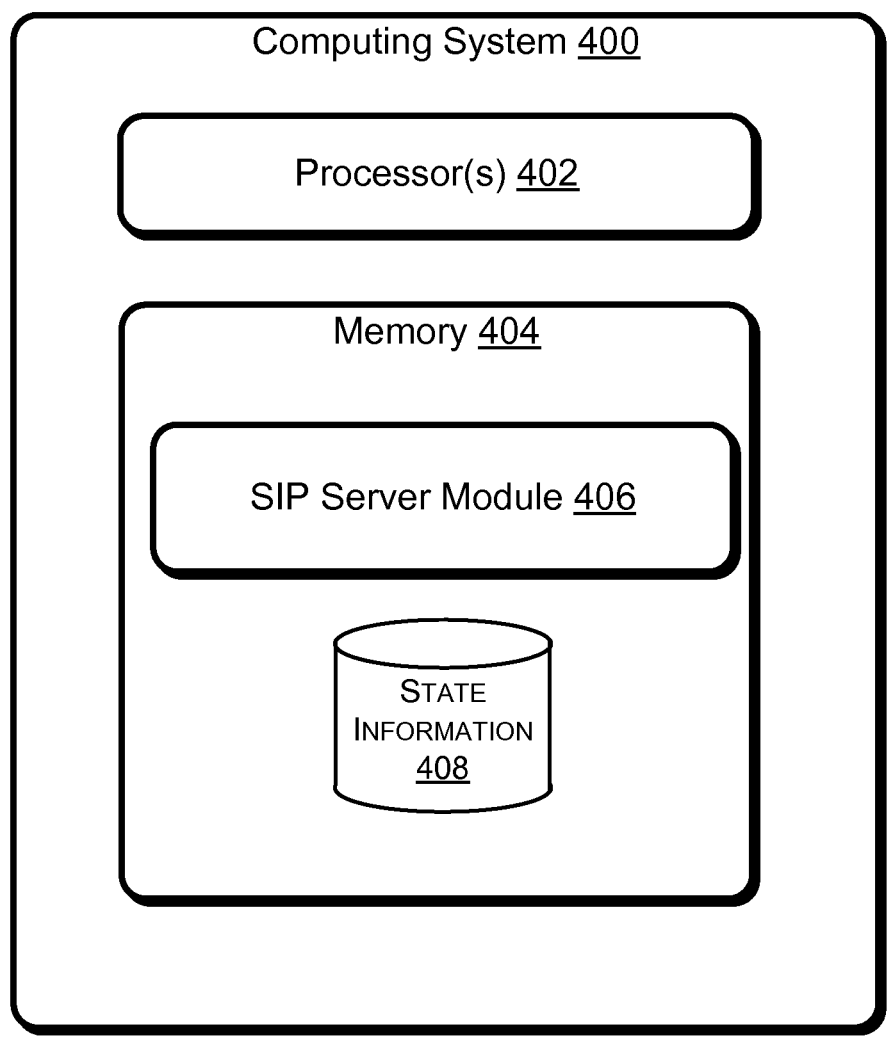
FIG. 4 illustrates an example network device configured to initiate backend polling based on nonzero SIP subscription expiration.

FIG. 4 illustrates an example computing system 400 configured to initiate backend polling based on nonzero SIP subscription expiration. The computing system is suitable to implement a SIP server, such as the SIP server 104, the RLS 206, or other SIP server. As illustrated in FIG. 4, computing system 400 includes processor(s) 402 and memory 404. A SIP server module 406 is executable by the processor(s) 402 to perform various functions of one or more of the SIP server 104 and the RLS 206 described elsewhere within this Detailed Description. For example, the SIP sever module 406 may receive from a client device a SIP subscribe message indicating a nonzero expiration, transmit to a backend server a SIP polling subscribe message, receive state information 408 from the backend server, and provide the state information 408 to the computing device.

The processes described above in association with FIGS. 1-3 can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, program modules, objects, components, data structures, and the like that perform particular functions or implement particular abstract data types. In other embodiments, hardware components perform one or more of the operations. Such hardware components may include or be incorporated into processors, application-specific integrated circuits (ASICs), programmable circuits such as field programmable gate arrays (FPGAs), or in other ways. The order in which the operations are described is not intended to be construed as a limitation, and any number of the described operations can be combined in any order and/or in parallel to implement the processes.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing system comprising:
one or more processors;
memory; and
one or more program modules stored on the memory and executable by the one or more processors to:
receive from a computing device a Session Initiation Protocol (SIP) subscribe message, the SIP subscribe message indicating a nonzero expiration time and requesting state information;
determine at least one backend server, of a plurality of backend servers, the at least one backend server being determined based at least in part on the requested state information included in the SIP subscribe message indicating the nonzero expiration time;
determine to utilize a backend polling mechanism with the at least one backend server based at least on: i) the nonzero expiration time being less than or equal to a predetermined expiration threshold, the predetermined expiration threshold being determined by a machine learning algorithm that utilizes a likelihood of not receiving updates to an initial state information as a criteria to determine the predetermined expiration threshold, and ii) a first characteristic of the computing device matching at least one of a second characteristic of a predetermined list of characteristics, the first characteristic of the computing device including at least one of a computing device operating system type, a computing device operating system version, or a computing device manufacturer, wherein a SIP polling subscribe message indicating a zero expiration time is transmitted to the at least one backend server when utilizing the backend polling mechanism;
transmit to the at least one backend server the SIP polling subscribe message indicating the zero expiration time to obtain the requested state information one-time;
receive the requested state information from the at least one backend server; and
provide the requested state information to the computing device.

2. The computing system of claim 1, wherein the one or more program modules are further executable by the one or more processors to determine to utilize the backend polling mechanism based on a further condition comprising a past behavior of the computing device.

3. The computing system of claim 2, wherein the past behavior of the computing device includes ending a session prior to an expiration time of a previous subscription.

4. The computing system of claim 2, wherein the past behavior of the computing device includes termination of an SIP subscription after receiving initial state information.

5. The computing system of claim 1, wherein the SIP subscribe message indicating a nonzero expiration time indicates a request for at least one of capability or presence information for one or more contacts, and wherein the state information includes the at least one of capability or presence information for one or more contacts.

6. The computing system of claim 1, wherein the computing device includes a Rich Communication Services (RCS) client.

7. The computing system of claim 1, wherein the computing system comprises a video call system.

8. The computing system of claim 1, wherein the one or more program modules are further executable by the one or more processors to determine to utilize a persistent subscription session with the computing device in response to receiving the SIP subscribe message indicating a nonzero expiration.

9. A method of operating a server, the method comprising:
receiving from a Session Initiation Protocol (SIP) client a SIP subscribe message, the SIP subscribe message indicating a nonzero expiration time and requesting state information;
determining at least one backend server, of a plurality of backend servers, the at least one backend server being determined based at least in part on requested state information included in the SIP subscribe message indicating the nonzero expiration time;
determining to initiate a backend polling session to a with the at least one backend server based at least on: i) the nonzero expiration time being less than or equal to a predetermined threshold time, the predetermined threshold time being determined by a machine learning algorithm that utilizes a likelihood of not receiving updates to an initial state information as a criteria to determine the predetermined threshold time, and ii) a first characteristic of the SIP client matching at least one of a second characteristic of a predetermined list of characteristics, the first characteristic of the SIP client including at least one of a client device operating system type, a client device operating system version, or a client device manufacturer, wherein a SIP polling subscribe message indicating a zero expiration time is transmitted to the at least one backend server to initiate the backend polling session;
transmitting to the at least one backend server the SIP polling subscribe message indicating the zero expiration time to obtain the requested state information one-time;
receiving, via the backend polling session, the requested state information; and
providing the requested state information to the SIP client.

10. The method of claim 9, wherein the SIP subscribe message indicates a request for at least one of presence information associated with a contact or capabilities information associated with a contact.

11. Non-transitory computer-readable media storing instructions executable by one or more processors to perform acts comprising:
receiving a request from a client device to establish a Session Initiation Protocol (SIP) subscription, the request indicating a session timeout greater than zero and requesting state information;
establishing the SIP subscription with the client device;
determining at least one backend server, of a plurality of backend servers, the at least one backend server being determined based at least in part on the requested state information included in the request indicating a session timeout greater than zero;
determining to initiate, with the at least one backend server, a backend polling subscription having a timeout equal to zero based at least on: i) the session timeout greater than zero being less than or equal to a predetermined expiration threshold, the predetermined expiration threshold being determined by a machine learning algorithm that utilizes a likelihood of not receiving updates to an initial state information as a criteria to determine the predetermined expiration threshold, and ii) a first characteristic of the client device matching at least one of a second characteristic of a predetermined list of characteristics, the first characteristic of the client device including at least one of a client device operating system type, a client device operating system version, a model number of the client device, or a client device manufacturer, wherein a SIP polling subscribe message indicating the timeout equal to zero is transmitted to the at least one backend server to initiate the backend polling subscription;
transmitting to the at least one backend server the SIP polling subscribe message indicating the timeout equal to zero to obtain the requested state information one-time;
obtaining the requested state information from the at least one backend server; and
providing, to the client device via the SIP subscription, the requested state information obtained from the at least one backend server via the backend polling subscription.

12. The non-transitory computer-readable media of claim 11, wherein the acts further comprise determining to initiate the backend polling subscription having the timeout equal to zero based on the request indicating a session timeout greater than zero.

13. The non-transitory computer-readable media of claim 11, wherein the acts further comprise: monitoring client device behavior during a plurality of SIP subscription sessions; and determining to initiate the backend polling subscription having the timeout equal to zero based on the client device behavior.

14. The non-transitory computer-readable media of claim 13, wherein the client device behavior includes: the client device receiving initial state information obtained from the backend server via prior persistent backend subscription sessions established previous to the backend polling subscription; and the client ignoring updates to the initial state information obtained from the backend server via the prior persistent backend subscription sessions.

15. The non-transitory computer-readable media of claim 11, wherein the request indicates a request for at least one of capability or presence information for one or more contacts, and wherein the state information includes the at least one of capability or presence information for one or more contacts.

16. The non-transitory computer-readable media of claim 11, wherein the client device includes a Rich Communication Services (RCS) client.

* * * * *